US006718550B1

(12) United States Patent
Lim et al.

(10) Patent No.: US 6,718,550 B1
(45) Date of Patent: Apr. 6, 2004

(54) METHOD AND APPARATUS FOR IMPROVING THE PERFORMANCE OF OBJECT INVOCATION

(75) Inventors: Swee Boon Lim, Mountain View, CA (US); Peter B. Kessler, Palo Alto, CA (US); Sanjay R. Radia, Fremont, CA (US); Graham Hamilton, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1378 days.

(21) Appl. No.: 08/670,684

(22) Filed: Jun. 26, 1996

(51) Int. Cl.[7] .................................................. G06F 9/46
(52) U.S. Cl. ..................................................... 719/300
(58) Field of Search .............................. 395/683, 681, 395/680, 200.33, 702; 709/303, 300; 719/300

(56) References Cited

U.S. PATENT DOCUMENTS

| 4,823,310 | A |   | 4/1989  | Grand |
| 5,218,699 | A | * | 6/1993  | Brandle et al. ............. 395/684 |
| 5,263,160 | A |   | 11/1993 | Porter, Jr. et al. |
| 5,341,478 | A | * | 8/1994  | Travis et al. ........... 395/200.33 |
| 5,455,951 | A |   | 10/1995 | Bolton et al. |
| 5,475,845 | A |   | 12/1995 | Orton et al. |
| 5,493,680 | A | * | 2/1996  | Danforth .................... 395/702 |
| 5,682,534 | A | * | 10/1997 | Kapoor et al. .............. 395/684 |
| 5,734,903 | A |   | 3/1998  | Saulpaugh et al. |
| 5,740,355 | A |   | 4/1998  | Watanabe et al. |
| 5,748,963 | A |   | 5/1998  | Orr |
| 5,758,342 | A |   | 5/1998  | Gregerson |
| 5,761,670 | A |   | 6/1998  | Joy |
| 5,787,447 | A |   | 7/1998  | Smithline et al. |
| 5,790,848 | A |   | 8/1998  | Wlaschin |
| 5,809,507 | A |   | 9/1998  | Cavanaugh, III |
| 5,815,703 | A |   | 9/1998  | Copeland et al. |
| 5,819,093 | A |   | 10/1998 | Davidson et al. |
| 5,835,906 | A |   | 11/1998 | Hagersten et al. |
| 5,848,236 | A |   | 12/1998 | Dearth et al. |
| 5,864,866 | A |   | 1/1999  | Henckel et al. |
| 5,873,116 | A |   | 2/1999  | Van Fleet |
| 5,881,315 | A |   | 3/1999  | Cohen |
| 5,913,038 | A |   | 6/1999  | Griffiths |
| 5,915,252 | A |   | 6/1999  | Misheski et al. |
| 5,926,775 | A |   | 7/1999  | Brumley et al. |
| 5,928,323 | A |   | 7/1999  | Gosling et al. |
| 5,933,605 | A |   | 8/1999  | Kawano et al. |
| 5,978,940 | A |   | 11/1999 | Newman et al. |

FOREIGN PATENT DOCUMENTS

| EP | 0604010 A1 | 6/1994 |
| EP | 0695992 A2 | 2/1996 |

OTHER PUBLICATIONS

Bull et al., Life Cycle and Association Services Specification, Feb. 19, 1993, Joint Object Services Submission.
Chin et al., Distributed Object–Based Programming Systems, Mar. 1991, vol. 23, No. 1.
Silicon Graphics, Iterators, 1996, http:www.rt.e–technik.tu-darmstadt.de/~mali–dOC/STL_doc/iterators.html, pp 1–3.
IONA Technologies, Ltd., Orbix, Oct. 29, 1996, Dublin, Ireland.

* cited by examiner

Primary Examiner—John Follansbee
(74) Attorney, Agent, or Firm—Beyer Weaver & Thomas, LLP

(57) ABSTRACT

Data structures, methods and devices for reducing computing overhead by utilizing different invocation paths for same process and different process invocations in a distributed client/server based computing system are disclosed. In one aspect of the invention, calls to a servant that do not share the same process as the requesting client are routed through a transport layer, and calls to servants that do share the same process as the requesting client are passed directly to the servant, thereby bypassing the transport layer. In another aspect of the invention, distinct remote and local method tables are provided to facilitate intelligent routing of requests. In still another aspect of the invention, the appropriate method table for an object reference is intelligently selected based upon the location of the identified object.

17 Claims, 13 Drawing Sheets

METHOD AND APPARATUS FOR IMPROVING THE PERFORMANCE OF OBJECT INVOCATION

CROSS REFERENCE TO RELATED APPLICATIONS

U.S. patent Ser. No. 08/554,794, now U.S. Pat. No. 5,577,251 entitled "Method and Apparatus for SubContracts in Distributed Processing Systems," filed Nov. 7, 1995 as a continuation to Ser. No. 07/995,863, filed Dec. 21, 1992 (now abandoned), is related to the present application and is incorporated by reference herein in its entirety. Additionally, the following U.S. patent applications, all filed concurrently herewith, are related to the present application and are also incorporated by reference herein in their entirety: application Ser. No. 08/670,682, now U.S. Pat. No. 6,044,224 application Ser. No. 08/673,181, now U.S. Pat. No. 6,032, 199 application Ser. No. 08/670,681, now U.S. Pat. No. 6,044,409, application Ser. No. 08/670,700 now U.S. Pat. No. 6,189,048 and application Ser. No. 08/669,782 now U.S. Pat. No. 5,991,823.

BACKGROUND OF THE INVENTION

1. Field of Invention

The present invention relates generally to the distributed object oriented computing systems. More particularly, methods, data structures and devices are disclosed that are arranged to improve the performance of object invocation in distributed object systems.

2. Description of the Prior Art

A computing environment in which objects are located on different computers linked by a network is typically referred to as a client-server computing environment. Some of the computers act as providers of services or functionality to other computers. The providers of service or functionality are known as "servers", and the consumers of the service or functionality are called "clients". The client-server model may also be generalized to the case where distinct programs running on the same computer are communicating with one another through some protected mechanism and are acting as providers and consumers of service or functionality.

Attempts to provide such a distributed system have been made using object-oriented methodologies that are based upon a client-server model in which server objects provide interfaces to client objects that make requests of the server objects. Typically, in such a distributed system, the servers are objects consisting of data and associated methods. The client objects obtain access to the functionalities of the server objects by executing calls on them, which calls are mediated by the distributed system. When the server object receives a call, it executes the appropriate method and transmits the result back to the client object. The client object and server object communicate through an Object Request Broker (ORB) which is used to locate the various distributed objects and to establish communications between objects. Distributed objects may exist anywhere in a network, as for example in the address space of the client, in multiple address spaces on the client machine, and in multiple machines across the network.

The software industry has responded to the need for a distributed object technology by forming the Object Management Group (OMG). The goal of the OMG is to define the Object Management Architecture (OMA), which has four major components: the Object Request Broker (ORB), Object Services, Common Facilities, and Application Objects. The Object Request Broker provides basic object communications and management services, thereby forming the basis of a distributed object system. A standard for an Object Request Broker is contained in the Common Object Request Broker Architecture (CORBA) specification.

In typical client-server, or distributed object, systems, the architecture is arranged such that regardless of the relative locations of a client and a server, a predetermined invocation path is used to route a request from a client to a server. That is, a request is routed through substantially the same layers of the system, regardless of whether the client and the server are in the same or different processes. This use of the same path for both local calls, i.e. the calls to servers located in the same process, and remote calls, i.e. calls to servers located in different processes is inefficient. Specifically, when the client and the server are in the same process, the transport level functions of marshaling a request for transfer from the client to the server and subsequently unmarshaling the request are unnecessary and prove to be an inefficient use of computing overhead. Accordingly, a method for reducing computing overhead by utilizing different invocation paths that are chosen based upon whether a client and a server are located within the same or different processes would be desirable to improve the overall performance of object invocation.

SUMMARY OF THE INVENTION

To achieve the foregoing and other objects and in accordance with the purpose of the present invention, data structures, methods and devices for reducing computing overhead by utilizing different invocation paths in a distributed client/server based computing system are disclosed. In one aspect of the invention, calls to a servant that do not share the same process as the requesting client are routed through a transport layer, and calls to servants that do share the same process as the requesting client are passed directly to the servant thereby bypassing the transport layer.

In another aspect of the invention, a distributed client/server computing system is provided which includes a plurality of client representations, a remote method table and a local method table. The distributed client/server based computing system is arranged to utilize object references which uniquely identify associated objects. Each object reference has an associated client representation, whereas selected client representations may be associated with a plurality of distinct object references. The remote method table is arranged to identify remote dispatch methods associated with a first set of the client representations. The remote dispatch methods are arranged to cause invocation requests to be routed through a transport layer. In contrast, the local method table is arranged to identify local dispatch methods associated with a second set of the client representations. The local dispatch methods are arranged to cause invocation requests to pass to a servant without being routed through the transport layer, thereby reducing the computing overhead associated with the invocation of local objects.

In one embodiment of the invention, the object references each include a first pointer arranged to identify an associated client representation and a second pointer arranged to identify an associated one of the method tables. In another embodiment, each method table includes a plurality of pointers arranged to directly or indirectly identify associated stubs. In this arrangement, each object reference that includes a pointer to a selected one of the methods tables has an associated set of stub functions that is pointed to by the selected method table. In some embodiments, multiple remote or local method tables are provided. In other embodiments, at least some of the client representations have both an associated remote method table and an associated local method table.

In another aspect of the invention, the methods that create object references that are to be used by a server, are arranged to intelligently determine whether the object reference should include a pointer to a local or a remote method table. By way of example, such object reference creating methods may include narrow methods, data object reference unmarshaling functions, and object reference destringifying methods.

BRIEF DESCRIPTION OF THE DRAWINGS

The invention, together with further objects and advantages thereof, may best be understood by reference to the following description taken in conjunction with the accompanying drawings which.

DETAILED DESCRIPTION OF THE INVENTION

Figure 1A:
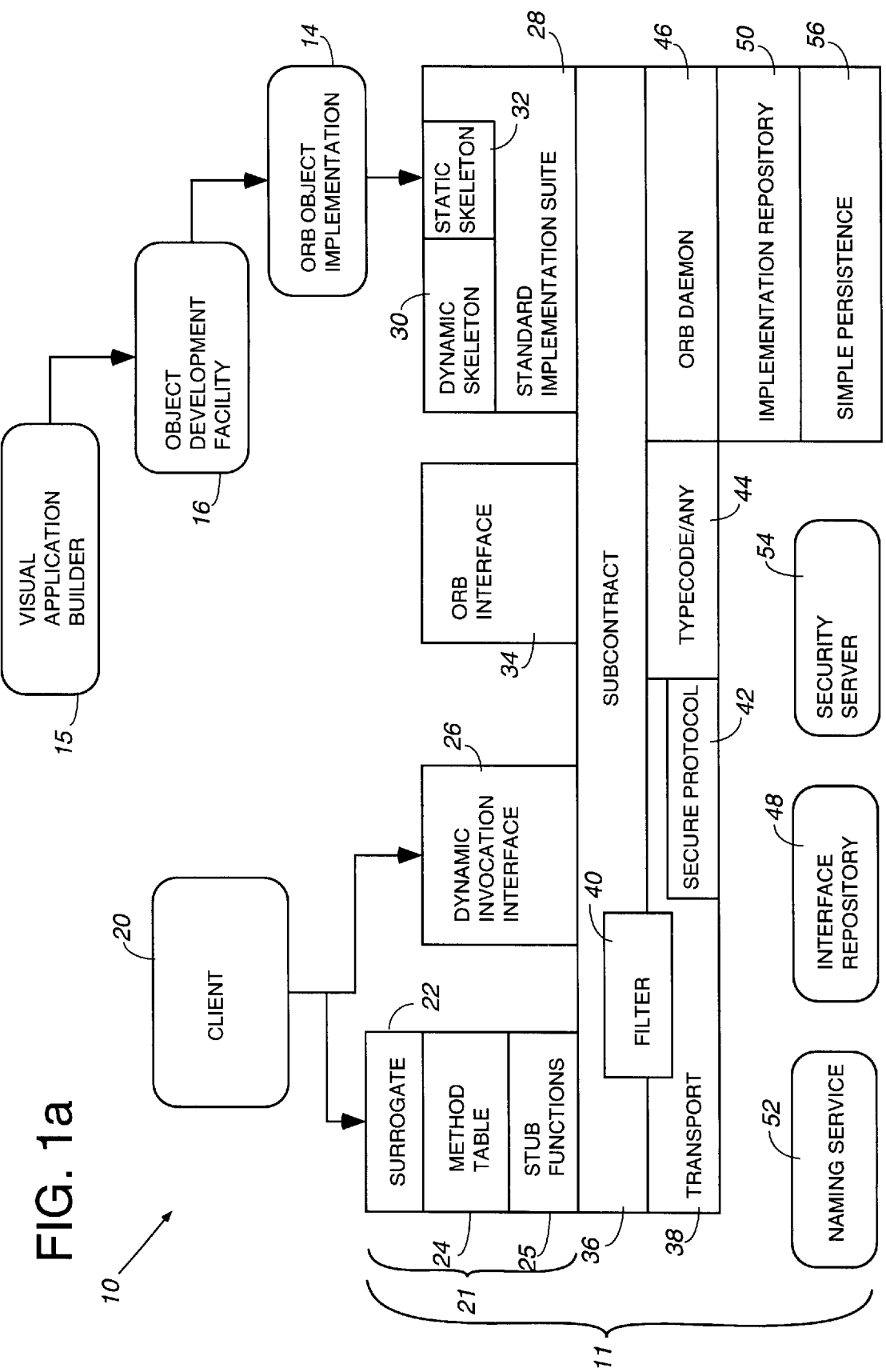
FIG. 1a is a symbolic overview of a distributed object system.
Figure 1B:
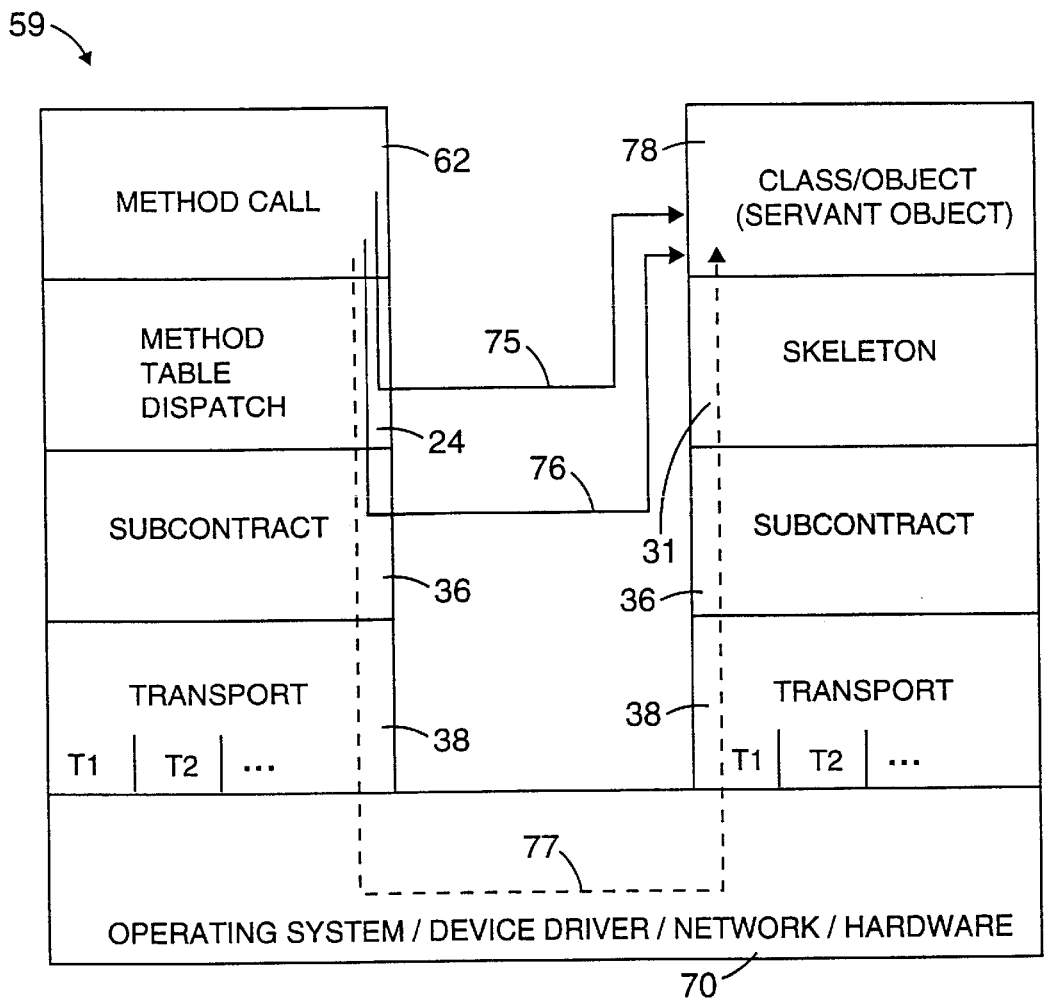
FIG. 1b is a diagrammatic illustration which represents how a request by a client is routed through the architecture of a client side and a server side of a distributed object system, and the interface between the client side and the server side of the distributed object system.
Figure 1C:
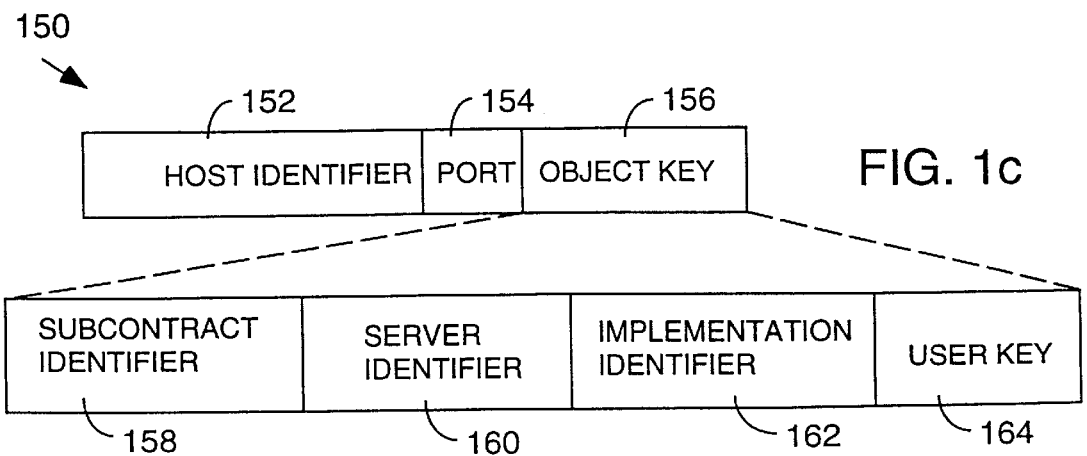
FIG. 1c is a diagrammatic representation of an object reference.

The present invention is directed toward distributed object systems and will be described with reference to several embodiments as illustrated in the accompanying drawings. The invention may be practiced within the context of any suitable distributed object system, including those defined under CORBA or any other suitable specification. However, for purposes of illustration, the present invention will be described primarily within the context of an Object Request Broker (ORB) implemented under the CORBA specification from the OMG, Revision 2.0, dated July 1995, which is incorporated herein by reference. FIG. 1a diagrammatically illustrates the overall architecture of a representative distributed object system suitable for implementing the present invention. FIG. 1b diagrammatically illustrates some possible flow paths that a request from a client to a servant object may follow within such an architecture that includes a three level dispatch mechanism. FIG. 1c shows one object reference data structure that may be used by a client to refer to a servant object.

A distributed object system 10 typically includes an Object Request Broker (ORB) 11 as is symbolically illustrated in FIG. 1a. ORB 12 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of distributed object or a process. Normal object implementation 14 is a representation of an object type defined in a traditional object programming language, such as C++. A wide variety of representations are possible. By way of example, an object implementation 14 may be a simple C++ object type that has been provided by an application developer. Alternatively, an implementation for an object type may be developed within a visual application builder 15. This visual application builder allows a developer to visually select existing object types from a catalog and graphically connect the services provided by one object to the services needed by another (attributes, arguments, etc.) in order to create a new implementation for an object type.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a method table dispatch 24, a subcontract layer 36, possibly a filter 40, and a transport layer 38. Stub 21 includes a surrogate 22, a method table 24, and a stub function 25. Client 20 communicates initially with surrogate 22 which appears to the client as the server object. Alternatively, client 20 may communicate directly with the server object through a dynamic invocation interface (DII) 26 instead of through surrogate 22, method table 24, and stub function 25. Dynamic invocation interface 26 is used to enable clients, as for example client 20, to construct dynamic requests. One procedure by which a client makes a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554, 794, filed Nov. 7, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in above-referenced U.S. patent application Ser. No. 08/670,682. Filter 40, if being used, may perform a variety of tasks, such as compression, encryption, tracing, or debugging, which are to be applied to communications to and from an object.

Transport layer 38 operates to marshal, unmarshal and physically transport information to and from a servant that typically does not share the same process as a client. A technique for marshaling/unmarshaling an objet reference is described in above-referenced U.S. Patent Application No. application Ser. No. 08/670,681. Mechanisms for marshaling and unmarshaling are described in above-referenced U.S. Patent Application No. application Ser. No. 08/673, 181.

A standard implementation suite 28 (or object adapter) represents a set of subcontracts that interact with ORB objects 14 in identical ways, as for example object key management. One such implementation suite is described in above-referenced U.S. patent application Ser. No. 08/669, 782. It should be duly noted that a subcontract may belong to multiple implementation suites. Hence, other implementation suites that utilize different subcontracts are possible. A skeleton, which may take the form of either static skeleton 32 or dynamic skeleton 30 is used to transform requests into a format required by a servant object 14. Thus, skeletons 32, 30 call an appropriate servant object 14. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter. An ORB Daemon 46 is responsible for ensuring that object servers are active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between process on the same machine. The security server 54 is a security administration server that secures the services that are used between processes on different computers.

Typecode/Any module 44 implements typecode and "Any" objects. Typecode describes an Interface Definition Language (IDL) data type, allowing type descriptions to be transmitted between clients and servers. An instance of an IDL data type may be encapsulated by an "Any" object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A name server 52 is used to name ORB objects. A client, as for example client 20, may use name server 52 to find a desired object by name. Name server 52 returns an object reference, which in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 1b. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface. As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers. A first pointer, or location indicator, points to a client representation ("client rep") associated with the referenced object. A second pointer, or location indicator, points to a method table of the method table dispatch 24 that is associated with the referenced object. It should be appreciated that as used herein, the term "pointer" is used to identify not only locations in computer or network memory, but the term "pointer" is also used to refer to a location indicator in general. A client representation is an object that has methods which support invocation as well as CORBA defined "pseudo" object reference operations. These operations include, but are not limited to, a duplicate method, a release method, a narrow method, a hash method, and an is_equivalent method.

After the client has initiated a call, the call is processed using a method table dispatch mechanism 24. Such a technique is disclosed in U.S. patent application Ser. No. 08/307, 929 and is hereby incorporated by reference. The method table dispatch mechanism uses a method table that contains a list of pointers, or location indicators, to stub functions 25, one of which is associated with the method to be invoked.

Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate stub function 25 to process the method call, and then pairs the method call with the appropriate stub function 25. In the event that the client making the method call is in the same process as the servant object, a local stub function is called. The local stub function sends the method call directly to servant object 78. Alternatively, if the servant object is in a different process, i.e. a remote process, a remote stub function is called. The remote stub function invokes the client representation, which delivers the invocation to servant object 78.

Subcontracts implemented by subcontract layer 36 are logic modules which provide control of the basic mechanisms of object invocation and argument passing that are important in distributed object systems. A subcontract implemented by subcontract layer 36 determines a specific quality of service for use by an object. A subcontract is uniquely identified by a subcontract identifier, which is typically embedded in an object reference. A quality of service is a set of service properties. Among possible service properties which are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., which is a part of the transport layer 38, is used to marshal and physically transport information to and from servant objects. Information, i.e. the object reference or the request, is converted into protocols appropriate to a given domain. By way of example, protocols may include, but are not limited to; Ethernet protocols and internet interoperable protocols (IIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system. While transport mechanisms require a conversion of information into a protocol appropriate to a given domain, some transport mechanisms to do not require the encoding of information for different domains. One transport mechanism which does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol which may be used by a different machine by virtue of the fact that information is remaining on the same host and therefore does not require a change of domain. Hence, information may simply be "flattened out," or marshaled into a stream which is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point which is a part of transport layer 38. In the event that an end point is not created by transport layer 38, transport layer 38 provides the functionality needed for the end point to be created by subcontract layer 36. By way of example, a door end point is typically created by subcontract layer 36, while other end points, including network and TCP/IP end points, are typically created by transport layer 38. Regardless of whether end points are created by subcontract layer 36 or transport layer 38, end points "live in," i.e. are a part of, transport layer 38. End points are essentially ports which receive information from a different domain. After an end point in transport layer 38 receives information transported from a different domain, the end point then dispatches the information from transport layer 38 to subcontract layer 36. Subcontract layer 36, or more specifically the subcontract in subcontract layer 36 which receives the information, then dispatches the information to the skeleton and the servant. Such a technique for performing this three-level dispatch is described in above-reference U.S. patent application Ser. No. 08/670,700.

Subcontract layer 36 provides the functionality to unmarshal at least some of the information it has received. That is, subcontract layer 36 unmarshals at least part of the request. Then, the request is dispatched to a skeleton 31 which transforms the request into an implementation specific format required by servant object 78. The skeleton may either be a static skeleton or a dynamic skeleton as described above.

In general, a remote request must be routed through the client side and the server side as described above. The method call 62 is received, method table dispatch layer 24 is used to identify an appropriate subcontract prior to the selection of a transport mechanism in transport layer 38 which marshals the request and prepares it for transport to another domain. Through hardware 70, the marshaled request is transported to the server side where it is received on an end point which is a part of transport layer 38. An appropriate end point receives information transported across a wire, and information is dispatched from transport layer 38 to subcontract layer 36, which provides the functionality to at least partially unmarshal the information it has received. The subcontract then dispatches the request to skeleton 31 which transforms the request into a specific format required by servant object 78. This path is shown by arrow 77, and is the path which may be taken by both remote and local requests.

However, if a client and a server are in a local process, i.e. both the client and the server are in the same process, the use of the path shown by arrow 77 as described above is unnecessarily complex. If it is known that the client and the server are in the same process, it is possible to shorten the invocation, or flow, path of a request for service. If a local process may be identified when an object reference is created, shortened flow paths, i.e. the paths represented by arrows 75 and 76, may be taken to send a request from what is a client to a server which are on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 1c will now be used to describe an embodiment of an object reference. As will be familiar to those skilled in the art, object references may take a variety of forms depending upon the location within the process that they are being held at any given time. However, by way of background, a representative object reference for use in a system which utilizes a low overhead object adapter is illustrated in FIG. 1c. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer which is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

Figure 2:
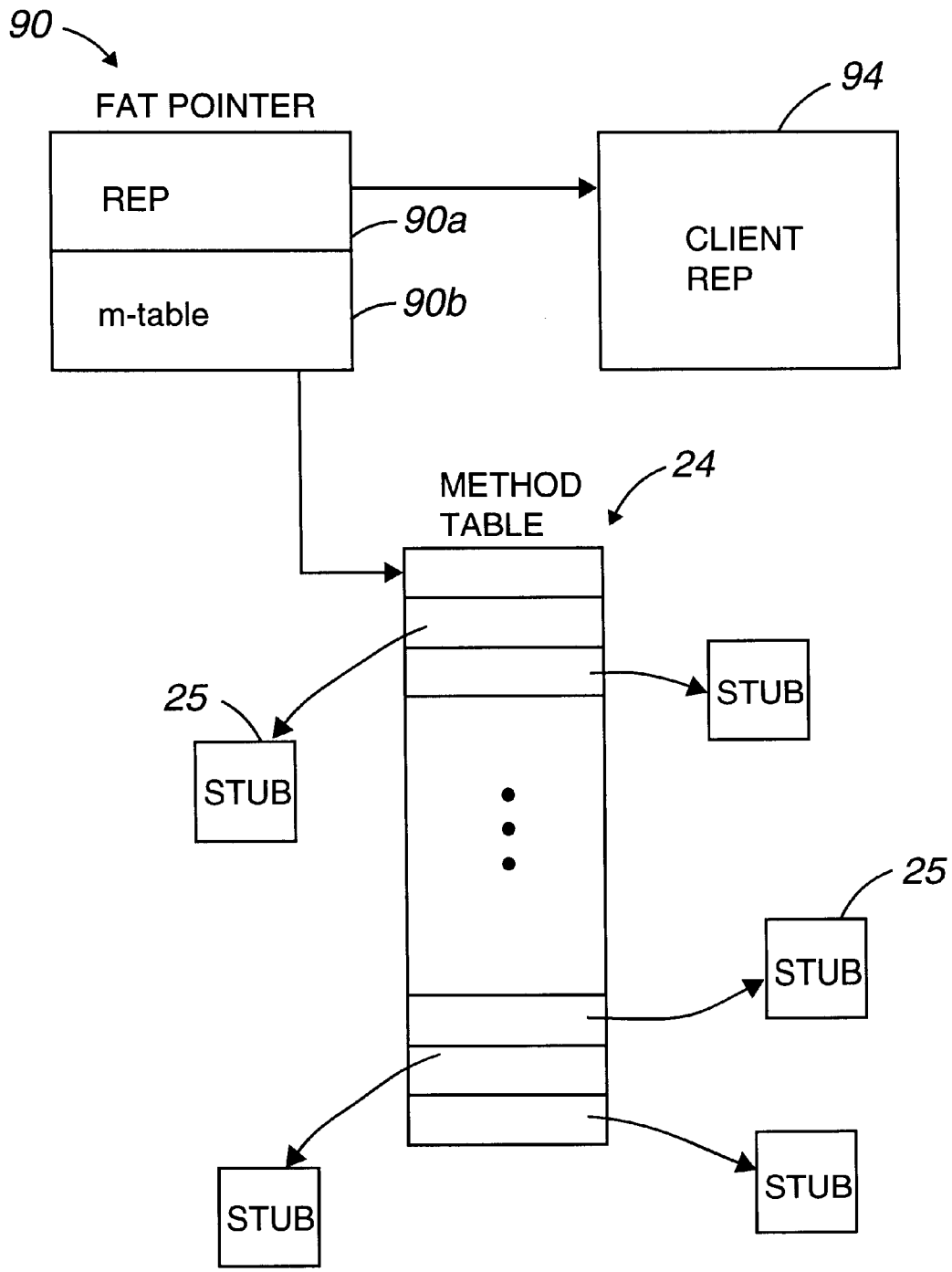
FIG. 2 is a diagrammatic illustration of the interfaces between a fat pointer, a client representation, and methods associated with a distributed object system.

Referring next to FIG. 2, the m-table dispatch mechanism will be described in more detail. As mentioned above, in the described embodiment, the object reference used by a client to identify a servant to be invoked may be thought of as a "dual" pointer or "fat pointer" 90. That is, a pointer structure which contains two "normal" pointers. The fat pointer 90 may also be considered to be a CORBA object reference. The size of each of the pointers will be dictated by the requirements of the system. The first pointer in fat pointer 90 is a client representation pointer 90a that points to a client representation ("client rep") 94. The second pointer in fat pointer 90 is an m-table pointer 90b that points to an m-table 24 associated with client representation 94.

As discussed above, a client representation 94 is an object which has methods to support object invocation and CORBA defined "pseudo" object reference operations which include duplicate and narrow methods. Client representation 94 may be thought of as a representation of the servant object on the client. Thus, client representation 94 is associated with a servant. Each object reference has a single associated client representation 94, whereas each client representation 94 may be associated with more than one distinct object reference. The subcontract of client representation 94 determines whether client representation 94 is associated with more than one object reference.

Each client representation 94 generally has an associated m-table. The associated m-table may be either a local m-table or a remote m-table. In some embodiments, multiple local or remote m-tables may be available. Some client representations may have more than one associated m-table. Whether client representation 94 stores and maintains both a local m-table and a remote m-table depends upon the implementation of the subcontract with which client representation 94 is associated. In general, m-table 24 contains an array of pointers to methods used to determine the dispatch. The dispatch is independent of client representation 94, as client representation 94 is an argument which is passed to stubs, or stub functions, 25. Stub functions 25, as previously described, receive a function call in the native language of the client process, then use support libraries to eventually call the corresponding servant object. The m-table used to determine the dispatch may point to stub functions 25 for the operation desired. Alternately, rather than pointing directly to stub functions 25, the m-table may point to other m-tables which, in turn, contain arrays of pointers to stub functions 25 used to determine the dispatch.

Each interface in a distributed object system may be associated with at least one m-table. However, it should be appreciated that some interfaces may not have any associated m-tables. M-tables are typically used with compiled, or static, stubs. Hence, for embodiments in which there are no compiled stubs, an interface may not have an associated m-table. Typically, each interface is associated with a single local m-table and a single remote m-table, although in some cases, an interface may be associated with more than one local m-table.

In general, m-tables may take on many different representations. By way of example, in some embodiments, m-tables may be "flat," or such that m-tables point directly to stub-functions. In other embodiments, m-tables may be tree-structured, i.e. m-tables may point to data structures which may point to stub functions 25 which are not pointed to directly by m-tables. It should be appreciated that a pointer for each method of a given interface is accessible from an m-table associated with the interface. Hence, if an m-table is tree-structured, it may be necessary to traverse the tree-structure of the m-table in order to find a pointer associated with the method.

As will be described in more detail below, one advantage of the proposed architecture is that by enabling a distinction to be made between local and remote procedures, it becomes possible to determine the best flow path or invocation path for a request received by the client. By way of example, if a client and a server are not in the same process, a received request is routed through at least the transport layer of both the client and the server, and when the server process is on a different host, a hardware layer as well. However, if a client and a server are local relative to one another, i.e. share the same process, it is not necessary to route a received request through transport layers and hardware layers. A modified, shorter flow path may be utilized if a client and a server are in the same process, and a received request may be routed to an appropriate servant object from either the subcontract layer on the client side or from the m-table dispatch layer. Routing a received request through transport layers and hardware layers (which requires marshaling and unmarshaling of the request and reply) when it is unnecessary compromises the efficiency, and therefore the performance, of object invocation. By constructing the object references in an intelligent manner which effectively identifies whether the servant will be in the same process as the client, it is possible to utilize shorter flow paths if a client and a server are in the same process. Hence, the performance.of object invocation is improved.

Figure 3:
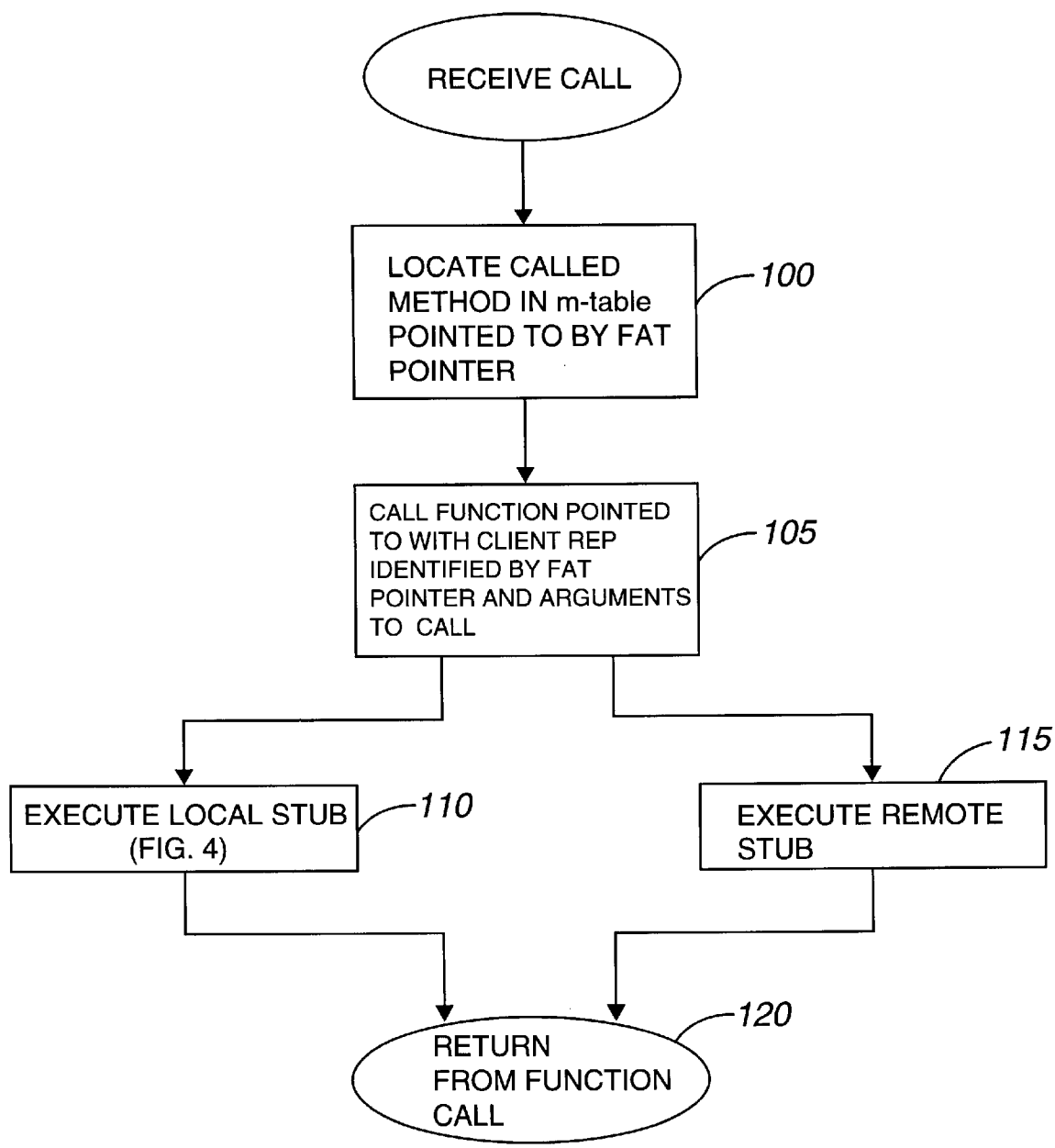
FIG. 3 is a process flow diagram which illustrates steps involved with an invocation of an object in accordance with one embodiment of the present invention.

Referring next to FIG. 3, the steps involved in the invocation of an object using an m-table dispatch will be described. Initially, a call is made using a fat pointer. In the described embodiment, the call is in the form of a C++ call although, of course, the nature of the call will typically be a function of the programming language that the client is written in. In step 100, the called method is located in the m-table pointed to by the fat pointer. If the called object is local, then the m-table pointed to by the fat pointer will be a local m-table. Similarly, if the called object is remote, then the m-table pointed to by the fat pointer will be a remote m-table. In step 105, a call is made to the stub function pointed to in step 100. The call, a C++ call in the described embodiment, is made with the client representation identified by the fat pointer and other arguments passed as call parameters. In some embodiments, additional arguments may be passed. After the stub function pointed to is called, process control branches off to different functions depending upon whether the stub function pointed to is in a local stub function or a remote stub function. If the function pointed to is in a local stub function, process control proceeds to a step 110 where a local stub function is executed. This local invocation will be discussed in more detail below with reference to FIG. 4. After the local stub has been executed in step 110, the process returns from the function call in step 120. If the function pointed to by the fat pointer is in a remote stub function, process control advances from step 105 to step 115, where a remote stub is executed. The process of executing a remote stub is discussed in detail in co-pending patent application Ser. Nos. 08/673,181 and 08/670,681 filed concurrently herewith, which are incorporated herein by reference. After the remote stub has been executed in step 115, process control proceeds to step 120, the return from the function call.

Figure 4:
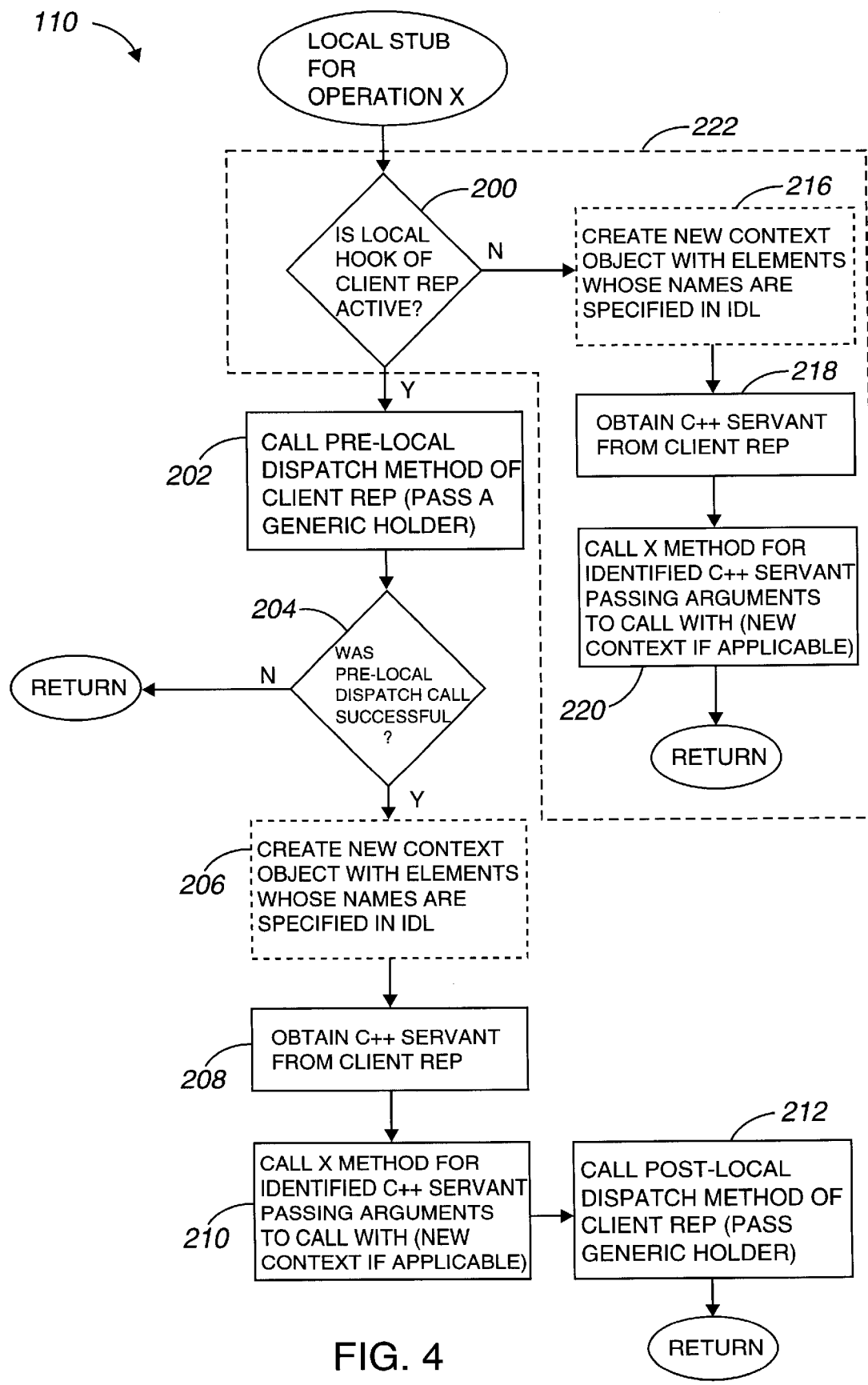
FIG. 4 is a process flow diagram which illustrates steps involved with the processing of a local stub in accordance with one embodiment of the present invention.

Referring next to FIG. 4, a method suitable for implementing an invocation using a local stub will be described. That is, one embodiment of step 110 of FIG. 3 will be described in more detail. With reference to FIG. 1b, the process of "executing" a local stub may be understood to be the process of invoking a servant through paths 75 or 76. The process of executing a local stub for an operation, as for example operation X, begins at step 200 with a determination of whether the local hook of the client representation passed by the local stub is active. Any suitable indication of whether a hook is active may be used. By way of example, the local hook may be a boolean flag that identifies whether the client representation, of which it is a part, is active. The local hook provides a mechanism by which additional code (such as code customized by an object developer) can be executed within the client-server system. That is, a local hook may be set to indicate whether or not a client-server system should execute additional code. In most embodiments, this decision would be made at compile time as opposed to run time so that when local hooks are not used, there would be no performance degradation due to providing the hook facility.

When the local hook is not active, the indication is that there is no additional code, particularly subcontract specific code, to include in the process of executing a local stub, and process control proceeds to step 216 where a new context object with elements whose names are specified in an interface definition language (IDL) is created from the original context passed in from the original call and the call to the stub function. An IDL is a language that is used to define the interfaces of objects. The context object is a list of associations, as for example a list that includes two strings, such as "USERNAME=foo" and "HOSTNAME=foo." More generally, a context object may be used to store preference information and information pertaining to the configuration of a distributed object system. After the context object has been created in step 216, process control advances to step 218 where a servant is directly obtained from the client representation. Since a local stub is being used, it is known that the client and servant share the same process. Therefore, the servant can be readily obtained using standard techniques as will be understood by those skilled in the art. The described context object creating step 216 is an optional step, and may be eliminated if desired. Typically, context creating step 216 is eliminated when the associated method is not specified with a context clause in IDL. If the associated method is not specified with a context clause, no context arguments will be passed as a part of the original call or the call to the stub function. If the context object creating step 216 is omitted, process control proceeds directly from step 200, where a determination was made that the local hook of the client representation was not active, to step 218, in which a servant is directly obtained from the client representation.

After the servant has been obtained in step 218, the method corresponding to operation X for the servant identified in step 218 is called in step 220. The arguments to the servant call in step 220 are typically the same arguments that are passed to the local stub in the stub calling step 105, with the exception of the client representation. In the event that a new context has been created in optional step 216, the new context is also passed with the call instead of the original context. After step 220 is completed, the results are returned. It should be appreciated that when the results are returned, the new context, if the new context was created, is automatically deleted or destructed.

If the determination in step 200 is that the local hook of the client representation is active, the indication is that additional code needs to be executed, and process control moves to step 202, in which a call is made to the pre-local dispatch method of the client representation. When the local hook of the client representation is active, the pre-local dispatch method is called before a local dispatch occurs in order to gather any information, required by the local dispatch, in particular the pointer to the servant object, that is specific to the client representation. The pre-local dispatch is used to make certain that a servant pointer may be successfully obtained. In addition, the prelocal dispatch method may perform additional subcontract processing to prepare the servant to receive calls (activation), to ensure that the caller has permission to invoke the servant (security), to store a transaction, or to acquire locks. It should be appreciated that the exact processing is dependent upon the subcontract associated with the client representation. In making the call to the pre-local dispatch method, a generic holder may be passed. The generic holder may be used to pass any desired information which pertains to the execution of a local stub from the pre-local dispatch method to a post-local dispatch method. The generic holder is provided to avoid the use of global or thread-specific storage to hold a per-invocation state pertinent to a subcontract. The generic holder is passed to the pre-local dispatch method which assigns a value to the generic holder. In general, the assigned value may be a pointer to a structure which may contain transaction identifiers and pointers to storage allocated in the pre-local dispatch that is typically freed in a subsequent post-local dispatch for the servant call.

From the call to the pre-local dispatch method of the client representation in step 202, process control proceeds to step 204 where it is determined whether the pre-local dispatch call was successful. If the call was unsuccessful, an exception, a C++ exception in this embodiment, occurs, and no further processing is done. If the call was successful, process control proceeds to step 206 where a new context object with elements whose names are specified in an IDL are created. Thereafter, process control advances to step 208, in which a servant is obtained from the client representation. After the servant has been obtained, the method corresponding to operation X is called for the identified servant in step 210. That is, in step 210, the local dispatch occurs. It should be appreciated that steps 206–210 mirror steps 216–220 as discussed above. Therefore, like context object creating step 216, context creating step 206 is an optional step.

After the local dispatch has been executed in step 210, process control proceeds to step 212 in which the post-local dispatch method of the client representation is called with the generic holder passed from the pre-local dispatch method. The post-local dispatch method recovers the value, which usually contains a pointer to a structure containing data pertinent to the local call, assigned to the generic holder. The post-local dispatch method is effectively the closure for the pre-local dispatch and is called to allow housekeeping operations corresponding to the pre-local dispatch operation to be performed. By way of example, the post-local dispatch method may deactivate the servant object, commit transactions, or release locks. In general, the pre-local dispatch and the post-local dispatch enable a subcontract to participate or intervene in local invocations. Once the post-local dispatch method is called to end the local dispatch process, the process of executing a local stub is complete.

It should be appreciated that if the local hook is enabled at compile time, steps 202 through 212, i.e. the call to a method which utilizes pre-local and post-local dispatch methods, are executed. If the local hook is not enabled at compile time, steps 216–220, i.e. the call to a method which does not utilize pre-local and post-local dispatch methods, are executed. In other words, the branch at step 200, the determination of whether the local hook is active, may not be necessary, as the branch may be predetermined by the compiler. Hence, only code pertaining to the predetermined branch is generated.

As mentioned above, constructing object references in an intelligent manner makes it possible to utilize shorter flow paths if a client and a server are in the same process. The construction of object references in an intelligent manner entails determining whether the object reference which is referred to, that is, the object reference from which a new object reference is to be created, is local relative to the server. If the object reference from which a new object reference is to be created is local to the server, a fat pointer, or a CORBA object reference, with an m-table pointer which points to a local m-table is created. If the object reference from which a new object reference is to be created is not local to the server, then a fat pointer with an m-table pointer which points to a remote m-table is created.

In order for a fat pointer, or CORBA object reference, to be created with an m-table pointer which points to, or is attached to, an appropriate m-table, a determination must be made when the fat pointer is being created as to whether the appropriate m-table is local or remote. Standard CORBA functions which are used to create object references include create methods, duplicate methods, narrow methods, unmarshal methods, and destringify methods. That is, the duplicate methods, narrow methods, unmarshal methods, and destringify methods may all be used to construct new object references. Hence, if in each of these methods (and any other methods which create new object reference), a determination is made regarding whether a servant will be in the same process as the object reference being created, it will be possible to use a shorter flow path to process a local request. In turn, the use of a shorter flow path, as previously discussed, serves to improve the performance of object invocation since in most instances a significant percentage of the object invocations will be local.

Figure 5:
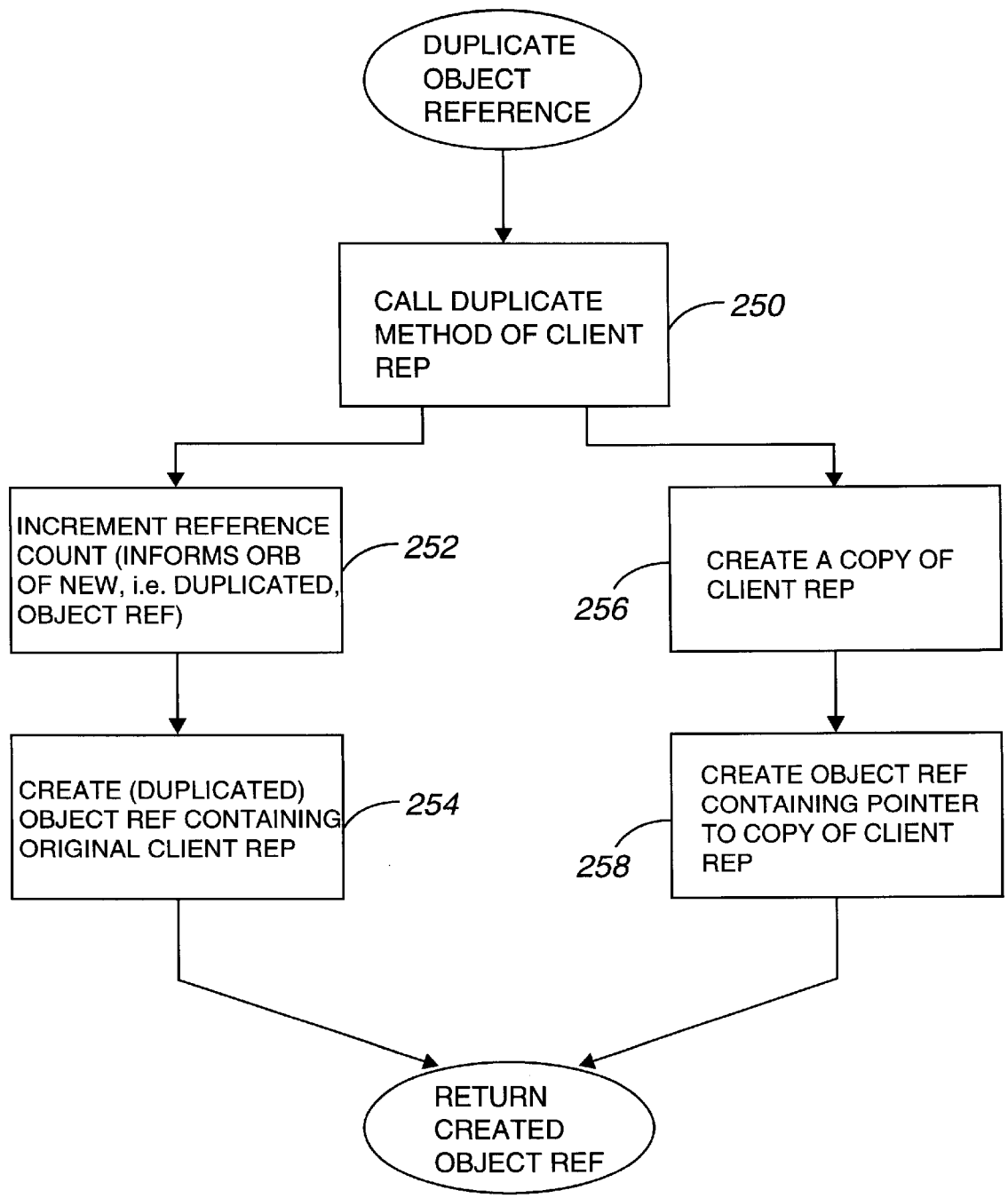
FIG. 5 is a process flow diagram which illustrates steps involved with the process of duplicating an object reference in accordance with one embodiment of the present invention.

Referring next to FIG. 5, a process of duplicating an object reference that determines whether the servant is local or remote in accordance with one embodiment of the present invention will be described. In the described embodiment, the process begins at step 250, with a call to the duplicate method of a client representation with which an object reference, or object "ref", is associated. The pointer to an m-table in the object reference to be duplicated is passed as an argument in the call to the duplicate method of the client representation. In other words, each client representation has a duplicate method that takes an m-table as an argument. The duplicate method which is called is typically identified by the client representation of the object reference. After the duplicate method is called in step 250, process control may either proceed to step 252 where a reference count in the client representation is incremented, or to a step 256 where a copy of the client representation is created. Whether a reference count is incremented in step 252 or a copy of the client representation is created in step 256 is dependent upon how the subcontract of the client representation manages the accountability of referenced objects. As will be appreciated by those skilled in the art, different mechanisms may be used to account for the number of outstanding object references that exist for a particular client representation. By way of example, a reference counter may be used to track the number of object references which refer to the same client representation. That is, a reference count may be incremented each time a duplicated object reference is created for the client representation in order to track the number of object references associated with the client representation. Alternatively, a new copy of the client representation may be made each time an object reference is created, etc. By creating a copy of the client representation each time an object reference is created, the number of object references may be readily accounted for, as there will be only one object reference per client representation.

If the accountability mechanism for a duplicate method involves incrementing a reference count, process control moves from the call to the duplicate method in step 250 to the incrementation of a reference count in step 252. The incrementation of a reference count results in the ORB being informed that a new, i.e. duplicated, object reference is about to be created. In step 254, the new object reference, which contains both a pointer to the client representation and the m-table pointer received as an argument to the call to the duplicate method, is created. The subcontract is aware that a new object reference has been created by virtue of the fact that a reference count was incremented in step 252. After a duplicated object reference is created in step 254, process control proceeds to return the newly created object reference. It should be appreciated that the steps of incrementing a reference count and creating the object reference which contains the original client representation are particular to some methods of duplicating object references.

If the accountability mechanism for a duplicate method involves creating copies of the client representation, process control moves from the call to the duplicate method of the client representation in step 250 to the creation of a copy of the client representation in step 256. After the copy of the client representation is created, process control then proceeds to step 258 in which a new object reference, which contains a pointer to the copy of the client representation and the m-table pointer received from the call to the duplicate method, is created. After a new object reference is created in step 258, process control proceeds to return the newly created object reference. It should be appreciated that the steps of creating a copy of the client representation and creating the object reference which contains a pointer to the copy of the client representation are particular to some methods used in duplicating object references.

It should be appreciated that each subcontract associates different duplicate methods with client representations with which the subcontract is associated. By way of example, as mentioned above, the steps of incrementing a reference count and creating an object reference which contains the original client representation are part of one such method, whereas the steps of creating a copy of the client representation and creating an object reference which contains a copy of the client representation are part of another such method. These methods may include additional processing relating to the subcontract which may contact the servant object whenever a new object reference is created.

The duplicate method is typically called by other operations, or methods, associated with a client representation. By way of example, the duplicate method may be called by a narrow method, an unmarshal method, and a destringify method, etc., which are all methods that belong to a client representation. As previously discussed, by determining whether a servant is in a local process with respect to the client when these methods are called, it becomes possible to associate created object references with either a local or a remote m-table. It follows that it may then be possible to identify a local process, and therefore utilize a shorter flow path to process a request, thereby improving the performance of object invocation.

Figure 6:
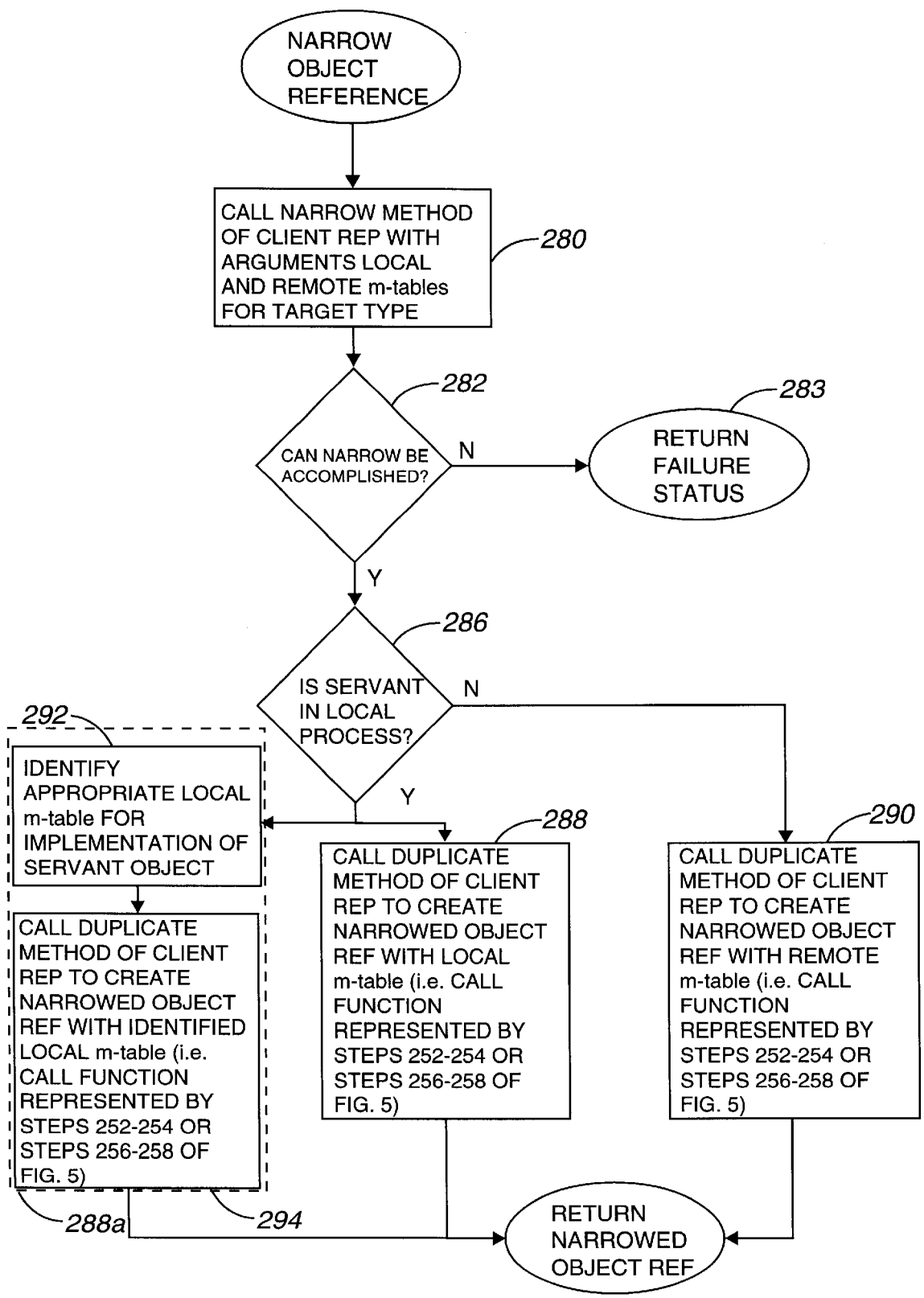
FIG. 6 is a process flow diagram which illustrates steps involved with the process of narrowing an object reference in accordance with one embodiment of the present invention.

Referring next to FIG. 6, a method of narrowing an object reference that determines whether the servant is local or remote in accordance with one embodiment of the present invention will be described. To narrow an object reference is essentially to convert the object reference from a general type to a specific, or target, type. Narrowing an object reference is one method which may be used to create a copy of the object reference. It should be appreciated that different subcontracts may have different client representations which have different narrow methods. The process of narrowing an object reference begins at step 280 in which the narrow method of the client representation is called using the associated local or remote m-table as an argument for the target type. At step 282, a determination is made regarding whether or not a narrow may be accomplished. If it is determined that a narrow cannot be accomplished, process control returns the failure status at step 283. However, if it is determined in step 282 that a narrow can be accomplished, process control proceeds to step 286 which is a determination of whether the servant is in a local process. The determination of whether the servant is in a local process is made by calling a function specifically written for the purpose of determining whether the servant is in a local process, as for example the is_local method of the client representation in the NEO distributed object system as described above. The is_local method of a client representation is specific to each subcontract and client representation. It should be appreciated that a local process does not simply refer to a process run on a local machine. Rather, the determination of whether the servant is in a local process is the determination of whether the servant is in the same process. If the result of step 286 is affirmative, i.e. the servant is in a local process, the duplicate method of the client representation is called using the local m-table as an argument in order to create a narrowed object reference with a local m-table pointer in step 288. It should be appreciated that the m-tables passed to the narrow method are m-tables which related to the target interface, or the interface to which the narrowed object reference is to conform. The duplicate method of the client representation creates an object reference which contains the specified m-table pointer and will return the created object reference as was previously described above with respect to FIG. 5. The new object reference is then returned as the result of the narrow operation.

If the determination is made in step 286 that the servant is not in a local process, process control proceeds to step 290 in which a call is made to the duplicate method of the client representation using the remote m-table as an argument. This creates a narrowed object reference with a remote m-table pointer. Once again, the duplicate method will create an object reference as was previously described above with respect to FIG. 5. The new object reference is then returned as the result of the narrow operation.

If a client representation is associated with one remote m-table and multiple local m-tables, once the determination is made in step 286 that the servant is in a local process, process control proceeds to step 288*a*, which serves the same general purpose as step 288, the step of creating a narrowed object reference with a local m-table. Step 288*a*, however, includes the identification of the appropriate local m-table to use in creating a narrowed object reference, when there is more than one local m-table with which the client representation is associated. Overall step 288*a* includes step 292 which is the step of identifying an appropriate m-table for the implementation of the servant object. The identification of an appropriate m-table is a subcontract, i.e. client representation, specific step. By way of example, an implementation repository associated with the subcontract may be used to locate a local m-table appropriate for the implementation of the servant object represented by the client representation. In the case of a client representation which has multiple associated m-tables, the local m-table which is passed as an argument to the narrow method is generally not used, unless the local m-table is found to be the appropriate local m-table for the implementation of the servant object. Once the appropriate local m-table is identified, the duplicate method of the client representation is called using the local m-table as an argument in order to create a narrowed object reference with a local m-table pointer in step 294. Then, the narrowed object reference is returned to the caller.

There are other mechanisms through which object references are created in typical distributed object oriented systems as well. One such mechanism is the unmarshaling of an object reference referred to in a request or a reply. As will be appreciated by those skilled in the art, information transferred over a network communications line or through an inter-process communications port is typically received in a marshal buffer. The received information arrives in a format associated with a selected network or inter-process communications protocol. Unmarshaling refers to the process of converting the information received in the marshal buffer to a format that is meaningful in a non-network environment.

In a distributed object oriented environment, most communications between clients and servers will begin with an object reference that is intended to identify the object that is the target of the request or reply. The request or reply also typically includes additional information, which may take the form of interface parameters, exception parameters, data, etc. that is intended for delivery to the target object. Occasionally, the data and/or parameters that accompany a request or a reply will include additional object references that are expected to be delivered to the target object, as opposed to being used for routing the request or reply. The unmarshaling mechanism must be arranged to properly route the request based at least in part on the target object reference, and convert (as necessary) the additional information into a form that is useable by the target object. Thus, when an object reference is a part of the parameters or other data that is to be delivered to a target object, then the unmarshaling function must effectively create an object reference that is meaningful to the target process. Since this is another potential mechanism by which object references are created, it is important to determine whether the "data" object reference refers to a "local" object or a "remote" object relative to the process that is receiving the request or reply.

Figure 7:
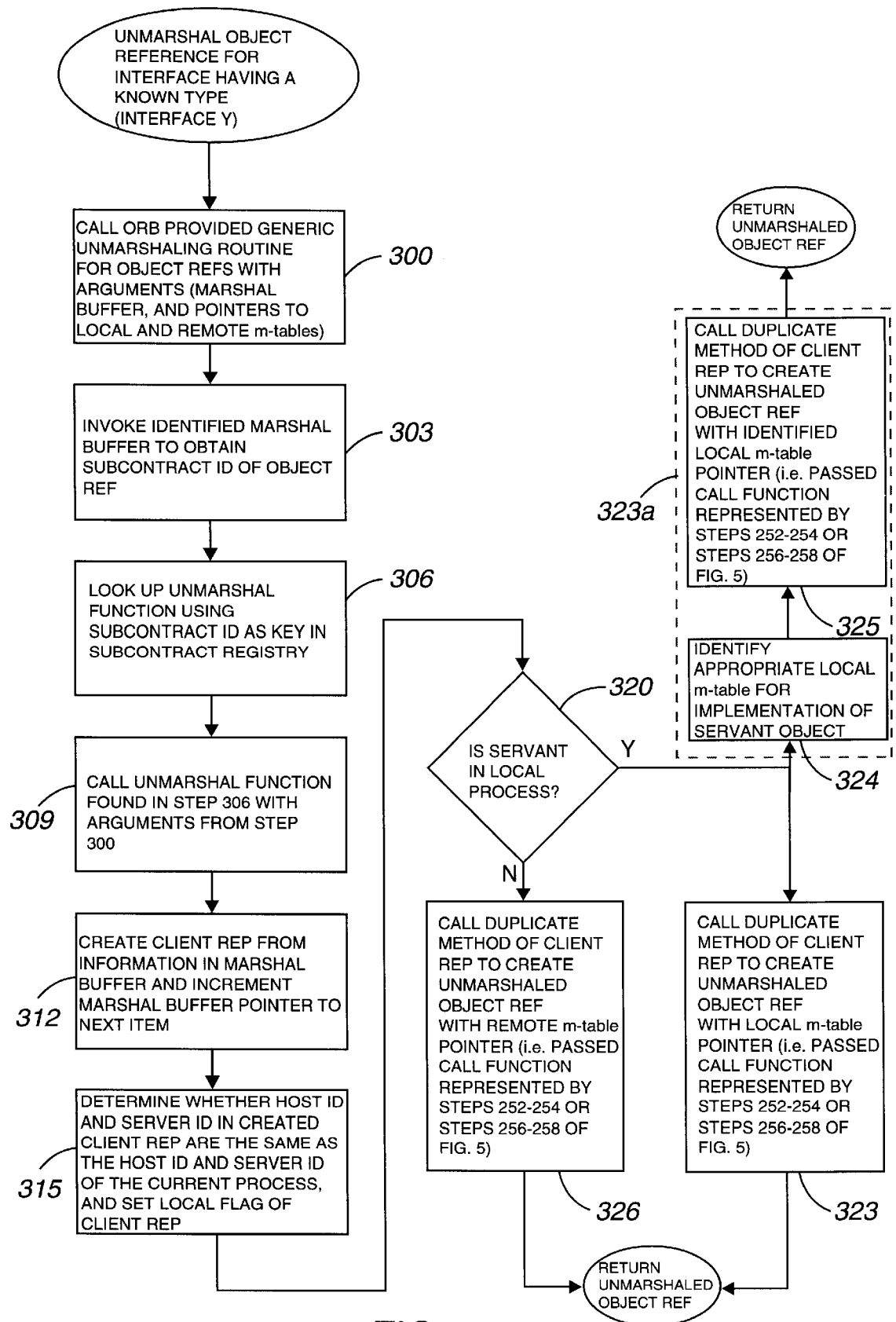
FIG. 7 is a process flow diagram which illustrates steps involved with the process of unmarshaling an object reference in accordance with one embodiment of the present invention.

Referring next to FIG. 7, a method of unmarshaling a data object reference referred to in a request or reply in accordance with one embodiment of the present invention will be described. As long as the interface type of the data object reference is known, a call may be made to an ORB-provided generic unmarshaling routine for data object references of the appropriate type in step 300. For the purposes of this example, the interface associated with the data object reference will be referred to as "interface Y." A suitable "generic" object reference unmarshaling routine is discussed in copending patent application application Ser. No. 08/670,681 filed concurrently herewith. The unmarshal method calls the ORB provided generic unmarshaling routine with both a pointer to the remote m-table for interface Y or a pointer to a local m-table for interface Y, as well as the marshal buffer for interface Y.

After the generic unmarshaling routine provided by the ORB is called, the subcontract identifier, i.e. subcontract ID, associated with the data object reference at step 303 is obtained. As the location of the subcontract identifier within an object reference is known, a "peek" method may be used to obtain the subcontract identifier from within the data object reference. The peek method reads, but does not extract, the subcontract identifier from the known location in the marshal buffer. Once the subcontract ID for the object reference is known, an unmarshal function corresponding to the object reference is looked up in a subcontract registry using the subcontract ID as a key. The subcontract registry is described in more detail in co-pending application application Ser. No. 08/669,786, filed concurrently herewith.

The unmarshal function found in step 306 is called in step 309, with arguments associated with interface Y, namely the remote and local m-tables, as well as the marshal buffer. After the call to the unmarshal function, process control proceeds to step 312, where a client representation is created from information in the marshal buffer. The marshal buffer pointer is then "added," or moved, to the next item in the marshal buffer. In step 315, it is determined whether the host identifier and server identifier, i.e. host ID and server ID, in the created client representation are the same as the host ID and the server ID of the current process. The local flag of the client representation is then set accordingly in step 315. That is, if the host ID and the server ID extracted from the object reference match the host ID and server ID of the current process, the local flag is set to a state indicative of a local servant. Otherwise, the local flag is set to a state indicative of a remote servant. In step 320, it is determined whether the servant is in a local process. As was described previously with respect to FIG. 6, the determination of whether the servant is in a local process is made by calling a client representation specific function specifically written for the purpose of determining whether the servant is in a local process. In this case, the function checks the local flag of the client representation. If the servant is in a local process, process control advances to step 323, and a call to the duplicate method of the client representation is made using a local m-table as an argument in order to create an unmarshaled object reference with a local m-table. The newly created unmarshaled object reference is then returned.

If a client representation is associated with one remote m-table and multiple local m-tables, once the determination is made in step 320 that the servant is in a local process, process control proceeds to step 323a, which serves the same general purpose as step 323, the step of creating an unmarshaled object reference with a local m-table. Step 323a, however, includes the identification of the appropriate local m-table to use in creating a narrowed object reference, when there is more than one local m-table with which the client representation is associated. Overall step 323a includes step 324 which is the step of identifying an appropriate m-table for the implementation of the servant object. The identification of an appropriate m-table is a subcontract, i.e. client representation, specific step. In the case of a client representation which has multiple associated m-tables, the local m-table which is passed as an argument to the unmarshal method is generally not used, unless the local m-table is found to be the appropriate local m-table for the implementation of the servant object. Once the appropriate local m-table is identified, the duplicate method of the client representation is called using the local m-table as an argument in order to create an unmarshaled object reference with a local m-table pointer in step 325. Then, the unmarshaled object reference is returned to the caller.

If it is determined in step 320 that the servant is not in a local process, process control proceeds from step 320 to step 326 where the duplicate method of the client representation is called using a remote m-table as an argument in order to create an unmarshaled object reference with a remote m-table. After step 326 is completed, the unmarshaled object reference is returned. The calls to the duplicate method of the client representation are -described above with respect to FIG. 5.

Figure 8:
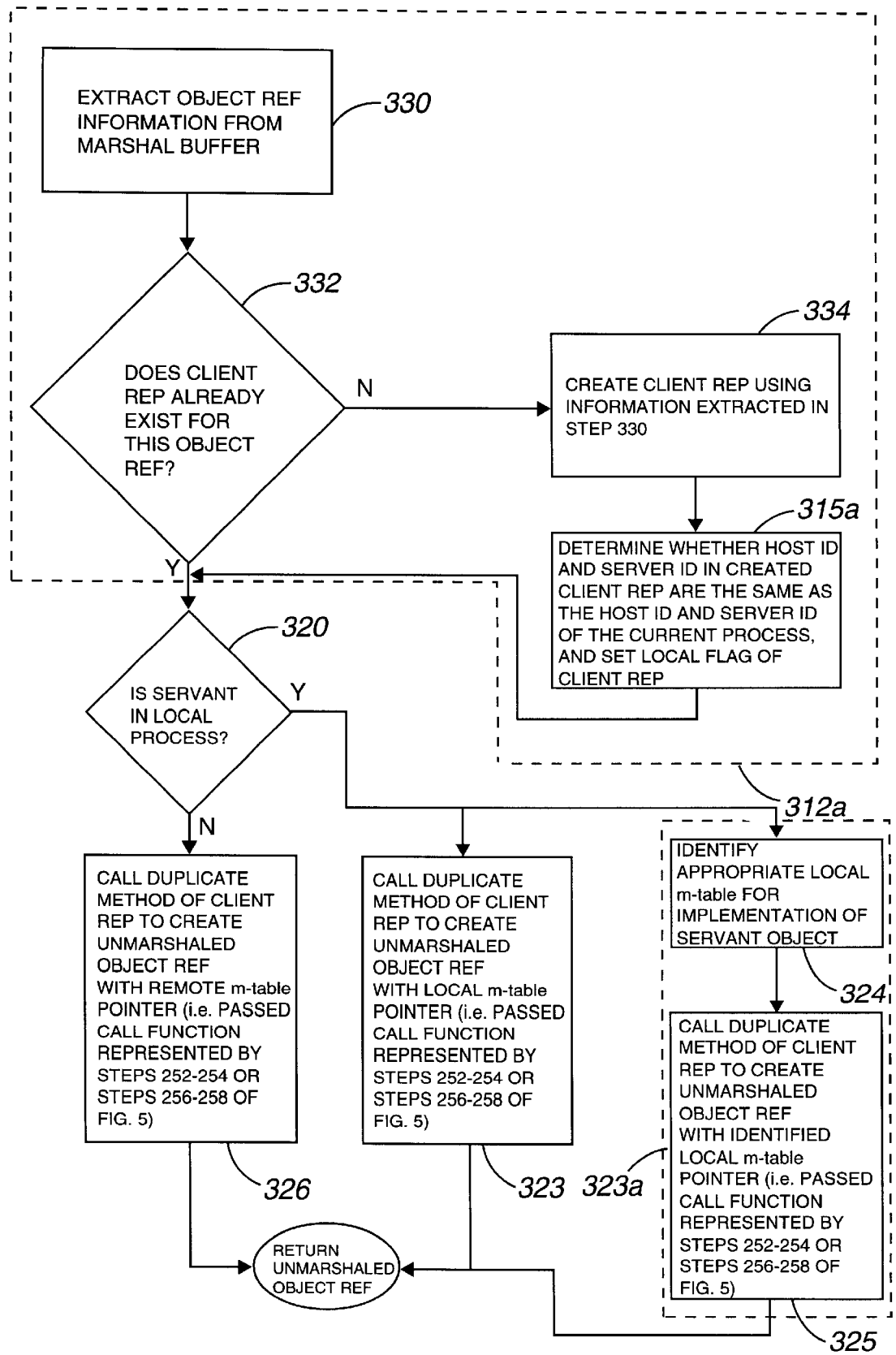
FIG. 8 is a process flow diagram which illustrates an alternative method for the step of creating a client representation from information in a marshal buffer in the process of unmarshaling an object reference as shown in FIG. 7 in accordance with one embodiment of the present invention.

Referring next to FIG. 8, an alternative method for creating a client representation from information in a marshal buffer will be described in the context of unmarshaling an object reference for an interface of a known type. In this embodiment, the process of unmarshaling an object reference is the same as the process described in FIG. 7 up until the step of creating a client representation. The creation of a client representation begins at step 330, where information pertaining to the object reference is extracted from the marshal buffer. Step 330 is a part of box 312a, and follows directly from step 306, the step of looking up an appropriate marshal function, of FIG. 7. After information pertaining to the object reference is extracted from the marshal buffer in step 330, a determination is made in step 332 as to whether a client representation already exists for the servant object referenced. If the result of the determination is negative, process control proceeds to step 334 in which a client representation is created using the information pertaining to the object reference which was previously extracted in step 330. Then, in step 315a, a determination is made regarding whether the host ID and the server ID in the newly created client representation are the same as the host ID and the server ID of the current process. Once the determination is made, a local flag of the client representation is set accordingly. It should be appreciated that the mechanisms used to determine whether a servant is in the same process may differ. By way of example, in embodiments where inter-host calls are not supported, a host ID may not be used. Once the local flag is set, process control then advances to step 320, the step of determining whether the appropriate servant is in a local process, as described above with respect to FIG. 7. If it is determined in step 332 that a client representation does already exist for the object reference, then process control proceeds directly from step 332 to step 320, and the determination of whether the appropriate servant is in a local process. Once process control reaches the step of determining whether the appropriate servant is in a local process, i.e. step 320, the remainder of the steps for unmarshaling an object reference for an interface having a known type are the same steps as described previously with respect to FIG. 7.

Figure 9:
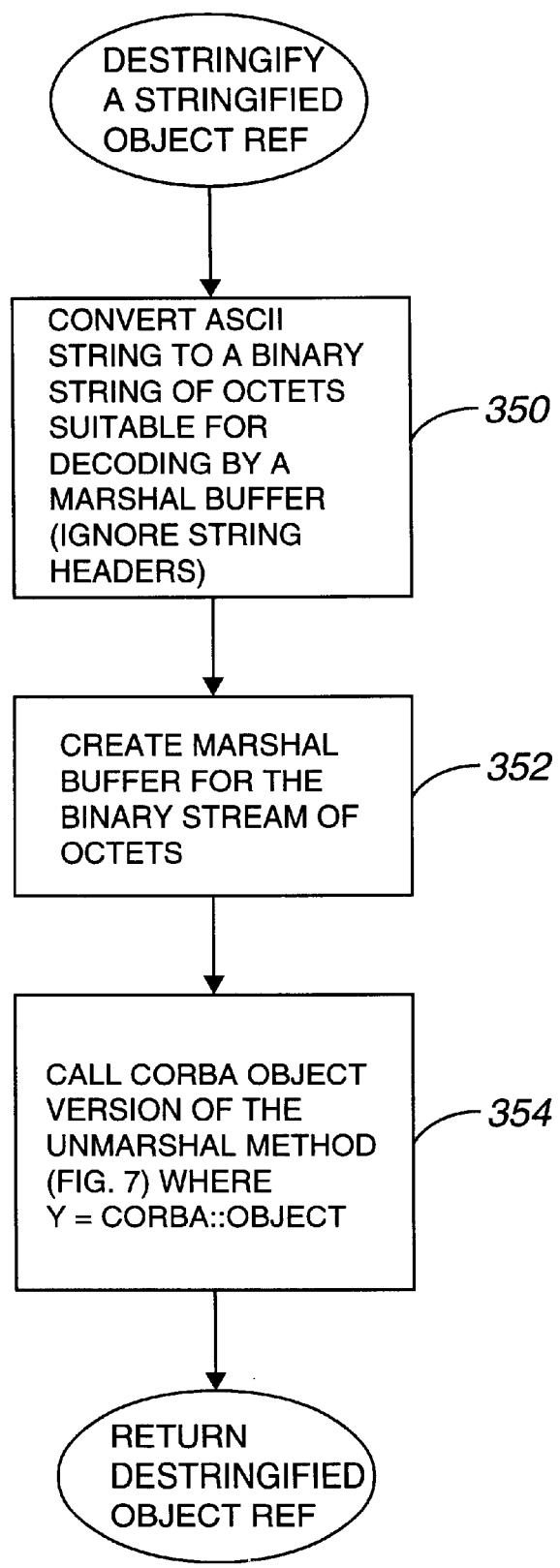
FIG. 9 is a process flow diagram which illustrates steps involved with the process of destringifying an object reference in accordance with one embodiment of the present invention.

Referring next to FIG. 9, a method of destringifying an object reference that determines whether the servant is local or remote in accordance with one embodiment of the present invention will be described. "Destringifying" an object reference entails converting an ASCII string into an object reference that is understandable by the receiving process. In other words, destringifying an object reference involves "de-hexifying" an ASCII string. The process of destringifying results in the creation of a new object reference, and in the described embodiment, begins at step 350 where an ASCII string, which is a stringified object reference, is converted into a string which is suitable for decoding by a marshal buffer. In the described embodiment, the string is a binary string, or stream, of octets which is suitable for decoding by a marshal buffer. It should be noted that an ASCII string typically includes headers at the beginning of the string. The headers are ignored, i.e. the headers are masked out, when the ASCII string is converted into a binary stream of octets. After the binary stream of octets is formed, process control advances to step 352 where a marshal buffer is created for the binary stream of octets. Next, in step 354, the CORBA object version of the unmarshal method is called. That is, the unmarshal method as described above with reference to FIG. 7 is called to unmarshal an object reference for interface Y. In this case, the interface, namely interface Y, of a known type is a CORBA object, i.e. Y=CORBA::Object. After the unmarshal method is called, the destringified object reference is returned.

Methods other than those described above, namely narrow, unmarshal, and destringify methods, may also be used in order to create object references. While some of these methods may call the duplicate method of the client representation, others may not. Generally, an object reference may be created from a servant if an implementation definition specific to the ORB, an interface definition, and reference data provided by a user are known, or given. The implementation definition includes the host ID and the server ID of the current process. If the implementation definition, the interface definition, and reference data are known, no explicit object adapter is needed to create an object reference. However, if reference data needs to be explicitly specified, an object adapter is necessary in order to create an object reference.

Figure 10:
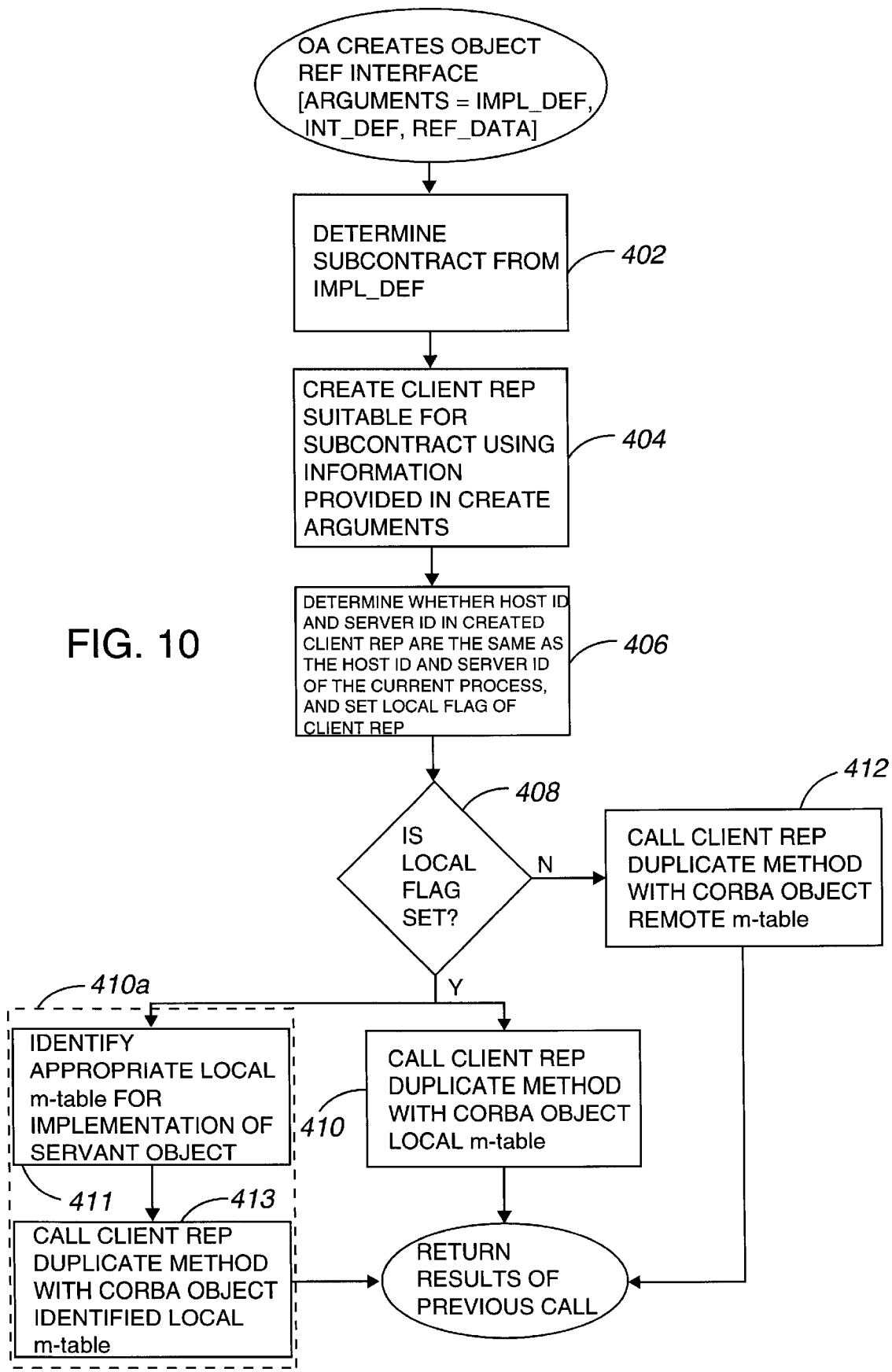
FIG. 10 is a process flow diagram which illustrates steps involved with using an Object Adapter interface to create an object reference in accordance with one embodiment of the present invention.

Referring next to FIG. 10, a method of creating an object reference that determines whether the servant is local or remote in accordance with one embodiment of the present invention will be described in association with using an object adapter (OA) interface to create an object reference. The OA uses as arguments an implementation definition, as for example IMPL_DEF in the NEO distributed object system, an interface definition, as for example INTF_DEF, and reference data, as for example REF_DATA, to create an object reference interface in a local process. In this embodiment, the use of INTF_DEF is optional. The process begins at step 402 where the argument IMPL_DEF is used to determine the subcontract associated with the object reference to be created. IMPL_DEF identifies which subcontract to use by determining which particular subcontracts are relevant. In step 404, a client representation suitable for the subcontract identified by IMPL_DEF is created using information provided in "create" arguments, i.e. arguments which specify information required for creating a client representation. After a suitable client representation is created, process flow proceeds to step 406 where a determination is made as to whether the host ID and the server ID in the created client representation are the same as the host ID and the server ID of the current process. Once the determination is made, a local flag of the client representation may be set accordingly. Process control then proceeds to step 408 which is the determination of whether the local flag is set to indicate whether or not the created client representation is local to the current process. That is, step 408 is the determination of whether the local flag is set to true. If the determination is affirmative, i.e. if it is determined that the local flag is set to true, a call to the duplicate method of the client representation—is made with a pointer to the CORBA object local m-table in a step 410. Then, the results are returned.

If the client representation has more than one associated local m-table, once the local flag is set to true, process flow moves to step 410a which includes the identification of the appropriate local m-table to use in creating a narrowed object reference, when there is more than one local m-table with which the client representation is associated. Overall step 410a includes step 411 which is the step of identifying an appropriate m-table for the implementation of the servant object. The identification of an appropriate m-table is a subcontract, i.e. client representation, specific step. In the case of a client representation which has multiple associated m-tables, the local m-table which is passed as an argument to the narrow method is generally not used, unless the local m-table is found to be the appropriate local m-table for the implementation of the servant object. Once the appropriate local m-table is identified, the a call is made to the duplicate method of the client representation with a pointer to the identified CORBA object local m-table in step 413. After the call to the duplicate method, the results of the call are returned.

If the determination in step 408 is that a local flag has not been set, or the local flag is set to false, process control proceeds to a step 412 in which a call to the client representation duplicate method is made with a pointer to the remote m-table of the CORBA object. At the completion of the call to the duplicate method of the client representation with the CORBA object remote m-table, the results of the call are returned.

As described earlier, a servant-based creation of an object reference is typically possible if an implementation definition, an interface definition, and reference data are provided. If the reference data is not provided and needs to be specified, an object adapter is required to create an object reference, as described above with respect to FIG. 10. If reference data is provided, however, an alternative to using narrow, unmarshal, or destringify methods to create object references is the use of a server representation to create an object reference. A server representation, which is in the same process as the servant, may be used to create an object reference. Since the server representation creates the object reference, the created object reference is in the same process as the servant.

Figure 11:
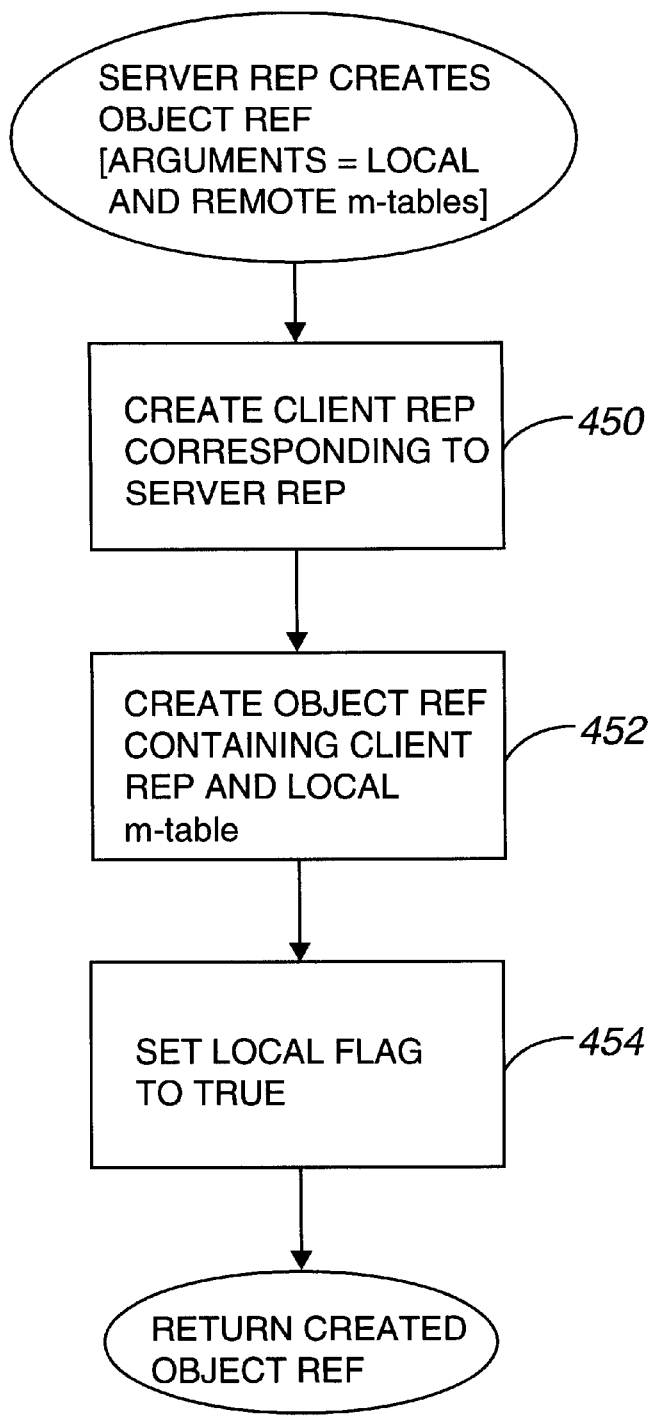
FIG. 11 is a process flow diagram which illustrates steps involved with using a server representation to create an object reference in accordance with one embodiment of the present invention.

Referring next to FIG. 11, a process of creating an object reference using a server representation will be described.

Server representations are described in more detail in co-pending application application Ser. No. 08/670,682 filed concurrently herewith. It should be appreciated that the terms server representation, or server "rep", and servant representation, or servant "rep", may be used interchangeably. With remote and local m-tables as arguments, the server representation, which is attached to the servant, may create an object reference. In a step 450, a client representation corresponding to the server representation is created. Arguments necessary to create the client representation, which is suitable for the subcontract with which it is associated, may be found in the server representation. After a client representation is created, process control proceeds to a step 452 in which an object, or object reference, containing the client representation and the pointer to a local m-table are created. Then, in a step 454, a local flag may be set to true to indicate that a client representation in the same process as the servant has been created, prior to the newly created object reference being returned. Setting the local flag to true is indicative of the fact that the client representation, i.e. object reference, is in the same process as the servant.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 12:
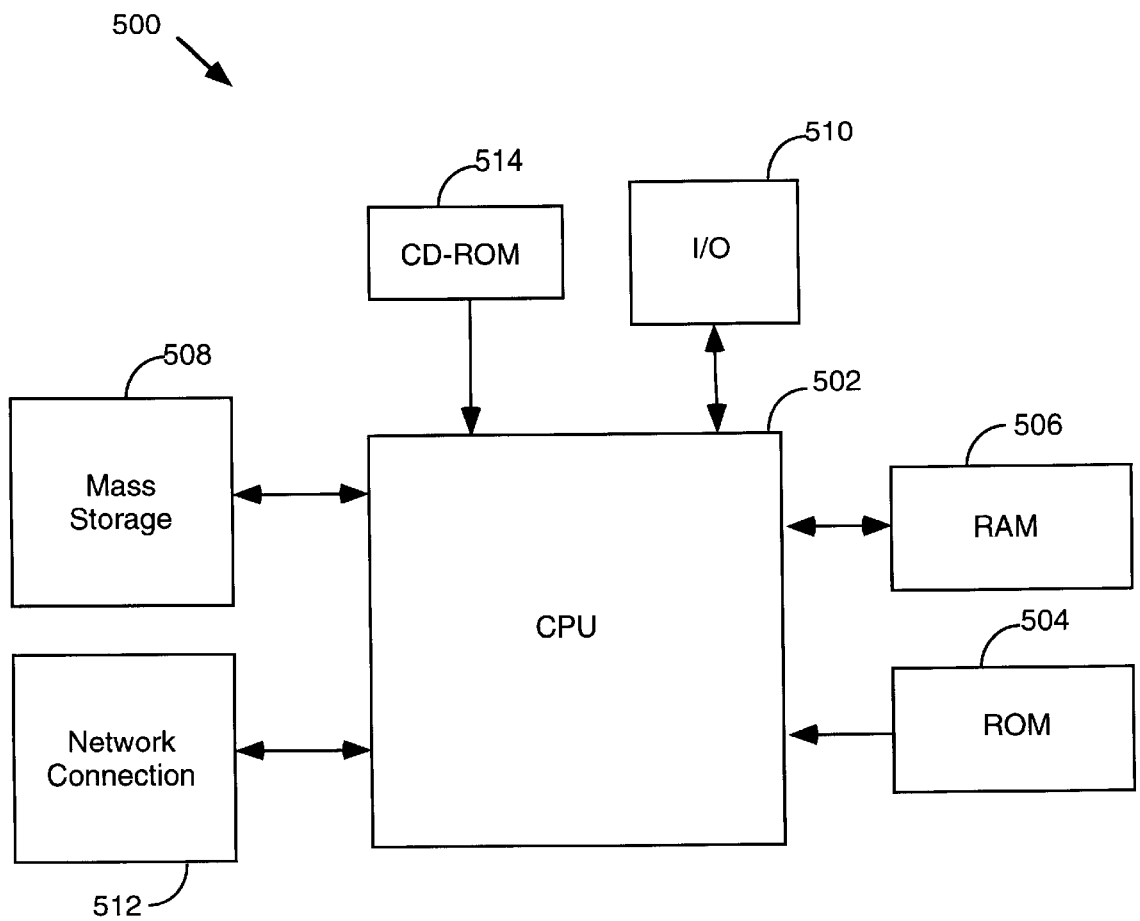
FIG. 12 illustrates a typical computer system in accordance with the present invention.

FIG. 12 illustrates a typical computer system in accordance with the present invention. The computer system 500 includes any number of processors 502 (also referred to as central processing units, or CPUs) that is coupled to memory devices including primary storage device 504 (typically a read only memory, or ROM) and primary storage device 506 (typically a random access memory, or RAM). As is well known in the art, ROM 504 acts to transfer data and instructions uni-directionally to the CPU and RAM 506 is used typically to transfer data and instructions in a bi-directional manner. Both primary storage devices 504, 506 may include any suitable computer-readable media as described above. A mass memory device 508 is also coupled bi-directionally to CPU 502 and provides additional data storage capacity. The mass memory device 508 may be used to store programs, data and the like and is typically a secondary storage medium such as a hard disk that is slower than primary storage devices 504, 506. Mass memory storage device 508 may take the form of a magnetic or paper tape reader or some other well-known device. It will be appreciated that the information retained within the mass memory device 508, may, in appropriate cases, be incorporated in standard fashion as part of RAM 506 as virtual memory. A specific mass storage device such as a CD-ROM 514 may also pass data uni-directionally to the CPU.

CPU 502 is also coupled to one or more input/output devices 510 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts.

Although only one embodiment of the present invention has been described, it should be understood that the present invention may be embodied in many other specific forms without departing from the spirit or the scope of the present invention. In particular, the m-table as described with respect to the present invention may take many different forms. By way of example, these forms may include, but are not limited to, flat m-tables, which have a structure that is similar to conventional C++ v-tables, and tree-structured m-tables. Therefore the described embodiments should be taken as illustrative and not restrictive, and the invention should be defined by the following claims and their full scope of equivalents.

What is claimed is:

1. In a distributed client/server based computing system having a dispatch mechanism for dispatching a call from client objects to servant objects that includes a transport layer, and a method table dispatch layer on the client side that is above the transport layer, the method table dispatch layer including a plurality of local method tables and a plurality of remote method tables, wherein a first set of selected client representations are associated with a local method table selected from the plurality of local method tables and a second set of selected client representations are associated with a remote method table selected from the plurality of remote method tables, the local method table including local dispatch information and the remote method table including remote dispatch information, a method of routing a call from a client to a servant, the method comprising:

routing the call using the remote method table and the transport layer when the client and servant do not share the same process; and routing the call using the local method table and bypassing the transport layer when the client and servant do share the same process.

2. In a distributed client/server based computing system arranged to utilize object references which uniquely identify associated objects, an arrangement comprising:

a plurality of client representations indicative of requests for service, each object reference having an associated client representation, wherein selected client representations may be associated with a plurality of distinct object references;

a remote method table arranged to identify remote dispatch methods associated with a first set of the client representations, the remote dispatch methods being arranged to cause invocation requests to be routed through a transport layer; and a local method table arranged to identify local dispatch methods associated with a second set of the client representations, the local dispatch methods being arranged to cause invocation requests to pass to a servant without being routed into the transport layer.

3. An arrangement as recited in claim 2 wherein the object references each include a first pointer arranged to identify an associated client representation and a second pointer arranged to identify an associated one of the method tables.

4. An arrangement as recited in claim 3 wherein each method table includes a plurality of pointers arranged to identify associated stubs, wherein each object reference that includes a pointer to a selected one of the methods tables has an associated stub that is pointed to by the selected method table.

5. An arrangement as recited in claim 2 wherein a plurality of remote method tables are arranged to identify remote dispatch methods associated with the first set of client representations.

6. An arrangement as recited in claim 2 wherein a plurality of local method tables are arranged to identify local dispatch methods associated with the second set of client representations.

7. An arrangement as recited in claim 2 wherein at least some of the plurality of client representations have both an associated remote method table and an associated local method table.

8. A computer program product comprising a computer-usable medium having computer-readable code embodied thereon for dispatching a call from client objects to servant objects using a dispatch mechanism that includes a transport layer, a method table dispatch layer on the client side that is above the transport layer, the method table dispatch layer including a plurality of local method tables and a plurality of remote method tables, wherein a first set of selected client representations are associated with a local method table selected from the plurality of local method tables and a second set of selected client representations are associated with a remote method table selected from the plurality of local method tables, the computer program product comprising computer-readable program code for effecting the following steps within the computer system:

routing the call using the remote method table and the transport layer when the client and servant do not share the same process; and routing the call using the local method table and bypassing the transport layer when the client and servant do share the same process.

9. A computer program product comprising a computer-usable medium having computer-readable code embodied thereon for invoking an object method defined on a distributed server object within a distributed object computing system, the distributed object computing system arranged to utilize object references which uniquely identify associated objects, the computer program product comprising computer-readable program code for an arrangement comprising:

a plurality of client representations indicative of requests for service, each object reference having an associated client representation, wherein selected client representations may be associated with a plurality of distinct object references;

a remote method table arranged to identify remote dispatch methods associated with a first set of the client representations, the remote dispatch methods being arranged to cause invocation requests to be routed through a transport layer; and a local method table arranged to identify local dispatch methods associated with a second set of the client representations, the local dispatch methods being arranged to cause invocation requests to pass to a servant without being routed into the transport layer.

10. A computer program product comprising computer-readable program code for an arrangement as recited in claim 9 wherein the object references each include a first pointer arranged to identify an associated client representation and a second pointer arranged to identify an associated one of the method tables.

11. A computer program product comprising computer-readable program code for an arrangement as recited in claim 10 wherein each method table includes a plurality of pointers arranged to identify associated stubs, wherein each object reference that includes a pointer to a selected one of the methods tables has an associated stub that is pointed to by the selected method table.

12. A computer program product comprising computer-readable program code for an arrangement as recited in claim 9 wherein a plurality of remote method tables are arranged to identify remote dispatch methods associated with the first set of client representations.

13. A computer program product comprising computer-readable program code for an arrangement as recited in claim 9 wherein a plurality of local method tables are arranged to identify local dispatch methods associated with the second set of client representations.

14. A computer program product comprising computer-readable program code for an arrangement as recited in claim 9 wherein at least some of the plurality of client representations have both an associated remote method table and an associated local method table.

15. In a distributed client/server based computing system having a dispatch mechanism for dispatching a call from client objects to servant objects that includes a transport layer, and a method table dispatch layer on the client side that is above the transport layer, the method table dispatch layer including a plurality of local method tables and a plurality of remote method tables, wherein a first set of selected client representations are associated with a local method table selected from the plurality of local method tables and a second set of selected client representations are associated with a remote method table selected from the plurality of remote method tables, the local method table including local dispatch information and the remote method table including remote dispatch information, a method of routing a call from a client to a servant, the method comprising:

routing the call using the remote method table and the transport layer when the client and servant do not share the same process; and routing the call using the local method table and not using the transport layer in any way when the client and servant do share the same process.

16. In a distributed client/server based computing system having a dispatch mechanism for dispatching a call from client objects to servant objects that includes a transport layer, and a method table dispatch layer on the client side that is above the transport layer, the method table dispatch layer including a plurality of local method tables and a plurality of remote method tables, wherein a first set of selected client representations are associated with a local method table selected from the plurality of local method tables and a second set of selected client representations are associated with a remote method table selected from the plurality of remote method tables, the local method table including local dispatch information and the remote method table including remote dispatch information, a method of routing a call from a client to a servant, the method comprising:

routing the call using the remote method table and the transport layer when the client and servant do not share the same process; and routing the call using the local method table and not accessing the transport layer in any way, when the client and servant do share the same process, wherein not accessing the transport layer in any way includes not routing the call into the transport layer.

17. In a distributed client/server based computing system arranged to utilize object references which uniquely identify associated objects, an arrangement comprising:

a plurality of client representations indicative of requests for service, each object reference having an associated client representation, wherein selected client representations may be associated with a plurality of distinct object references;

a remote method table arranged to identify remote dispatch methods associated with a first set of the client representations, the remote dispatch methods being arranged to cause invocation requests to be routed using a transport layer; and a local method table arranged to identify local dispatch methods associated with a second set of the client representations, the local dispatch methods being arranged to cause invocation requests to pass to a servant without using the transport layer in any way.

* * * * *